United States Patent
Sun et al.

(10) Patent No.: US 10,203,961 B2
(45) Date of Patent: *Feb. 12, 2019

(54) BIOS CONTROL METHOD FOR PCI-E LANE

(71) Applicant: GIGA-BYTE TECHNOLOGY CO.,LTD., New Taipei (TW)

(72) Inventors: Pei-Hua Sun, New Taipei (TW); Yen-Yun Chang, New Taipei (TW); Weiyuan Cheng, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 151 days.

This patent is subject to a terminal disclaimer.

(21) Appl. No.: 15/255,167

(22) Filed: Sep. 2, 2016

(65) Prior Publication Data

US 2018/0011713 A1  Jan. 11, 2018

(30) Foreign Application Priority Data

Jul. 6, 2016 (TW) .............................. 105121443 A

(51) Int. Cl.
G06F 13/14       (2006.01)
G06F 9/4401      (2018.01)
G06F 13/40       (2006.01)
G06F 13/42       (2006.01)

(52) U.S. Cl.
CPC ........ G06F 9/4401 (2013.01); G06F 13/4022 (2013.01); G06F 13/4068 (2013.01); G06F 13/4282 (2013.01)

(58) Field of Classification Search
CPC ............ G06F 13/4022; G06F 13/4068; G06F 13/4282; G06F 2213/0026; G06F 9/4401
See application file for complete search history.

(56) References Cited

U.S. PATENT DOCUMENTS

| 7,174,411 B1* | 2/2007 | Ngai ................... G06F 13/4022 710/305 |
| 7,246,190 B2* | 7/2007 | Nguyen ................ G06F 13/405 370/402 |
| 7,711,886 B2* | 5/2010 | Foster, Sr. ............ G06F 13/409 710/307 |
| 7,756,123 B1 | 7/2010 | Huang et al. |

FOREIGN PATENT DOCUMENTS

TW         201621679         6/2016

OTHER PUBLICATIONS

"Office Action of Taiwan Counterpart Application," dated Aug. 28, 2017, p. 1-p. 7, in which the listed references were cited.

* cited by examiner

Primary Examiner — Idriss N Alrobaye
Assistant Examiner — Richard B Franklin
(74) Attorney, Agent, or Firm — JCIPRNET

(57) ABSTRACT

A BIOS control method for PCI-E lanes includes the following steps. A BIOS obtains information of whether a first expansion card and a second expansion card are respectively inserted in a first PCI-E slot and a second PCI-E slot, and if the second expansion card is inserted in the second PCI-E slot, then the BIOS instructs a CPU to reverse the order of PCI-E lanes electrically connected between the CPU and the second PCI-E slot.

15 Claims, 4 Drawing Sheets

BIOS CONTROL METHOD FOR PCI-E LANE

CROSS-REFERENCE TO RELATED APPLICATION

This application claims the priority benefit of Taiwan application serial no. 105121443, filed on Jul. 6, 2016. The entirety of the above-mentioned patent application is hereby incorporated by reference herein and made a part of this specification.

BACKGROUND OF THE INVENTION

Field of the Invention

The invention relates to a control method, and more particularly, to a BIOS control method for PCI-E lanes.

Description of Related Art

The PCI-E interface is a common external expansion interface card interface currently used in computers. This technique was originally designed to achieve high-speed data transmission. In particular, the PCI-E interface provides a dedicated bus to each equipment. Data is transmitted in series via send and receive signals referred to as lanes in a packaged format, and each lane of the third-generation PCI-E interface has the speed of 8 gb/s in single direction. A plurality of lanes can be combined to form x1, x2, x4, x8, x12, x16, even x32 lane bandwidths.

In an average high-end computer, two or more than two PCI-E slots are generally provided. The BIOS in the computer detects which PCI-E slots the PCI-E expansion cards are inserted in, and instructs the CPU how to assign the PCI-E lanes to the first PCI-E slot (generally the PCI-E slot adjacent to the CPU) and the second PCI-E slot (generally the PCI-E slot farther from the CPU) according to the detection results.

More specifically, FIG. 1 and FIG. 2 are schematics of PCI-E lanes of a known CPU assigned in two PCI-E slots. Referring to FIG. 1 and FIG. 2, PCI-E lanes are assigned from the first PCI-E pin sets in each PCI-E slot (leftmost first PCI-E pin sets 21 of a first PCI-E slot 11 and leftmost second PCI-E pin sets 22 of a second PCI-E slot 12 in FIG. 1 and FIG. 2) to the right in order. In the known control method, in the case that a CPU 10 supports x16 PCI-E lanes (such as 16 PCI-E lanes numbered 00 to 15), 8 PCI-E lanes numbered 00 to 07 are formed between first 8 processor pin sets 20 of the CPU 10 and the first 8 first PCI-E pin sets 21 of a first PCI-E slot 11. 8 PCI-E lanes numbered 08 to 15 are switched to the second-half of the first PCI-E pin sets 21 of the first PCI-E slot 11 or the first-half of the second PCI-E pin sets 22 of the second PCI-E slot 12 according to the insertion state of the expansion card.

Therefore, if an expansion card is only inserted in the first PCI-E slot 11, then the BIOS 50 instructs the CPU 10 to switch the 8 PCI-E lanes numbered 08 to 15 to the first PCI-E pin sets 21 of the first PCI-E slot 11. That is, the 1st to 16th first PCI-E pin sets 21 of the first PCI-E slot 11 are assigned to 16 PCI-E lanes numbered 00 to 15 in order and are provided to the x16 PCI-E signal of the first PCI-E slot 11 as shown in FIG. 1.

If an expansion card is inserted in both PCI-E slots, then the BIOS 50 instructs the CPU 10 to switch the 8 PCI-E lanes numbered 08 to 15 to the first-half of the second PCI-E pin sets 22 of the second PCI-E slot 12. In other words, the 1st to 8th first PCI-E pin sets 21 of the first PCI-E slot 11 are assigned to the 8 PCI-E lanes numbered 00 to 07 in order, the 1st to 8th second PCI-E pin sets 22 of the second PCI-E slot 12 are assigned to the 8 PCI-E lanes numbered 08 to 15 in order, and are respectively provided to two PCI-E slots x8, x8 PCI-E signals as shown in FIG. 2. In other words, currently, the second PCI-E slot 12 can at most receive half of the PCI-E signal.

However, since the size of the heat sink of the current high-performance CPU 10 is large, after installation, mechanical interference with the first PCI-E slot 11 may occur, or if the first PCI-E slot 11 is damaged, the user can only insert the expansion card in the second PCI-E slot 12. However, currently, the second PCI-E slot 12 can only receive half of the PCI-E signal such that performance is reduced.

SUMMARY OF THE INVENTION

The invention provides a BIOS control method for PCI-E lanes allowing a second PCI-E slot to receive a complete PCI-E signal.

A BIOS control method for PCI-E lanes of the invention is suitable for applying to a motherboard module. The motherboard module includes a ROM, a CPU, a RAM electrically connected to the CPU, a first PCI-E slot, and a second PCI-E slot, wherein the ROM is electrically connected to a memory and stores a BIOS, the BIOS is suitable to be loaded in the memory, and the CPU, the first PCI-E slot, and the second PCI-E slot respectively support PCI-E lanes whose number is 2N. The BIOS control method for PCI-E lanes includes the following steps. A BIOS obtains information of whether a first expansion card and a second expansion card are respectively inserted in a first PCI-E slot and a second PCI-E slot; and if the second expansion card is inserted in the second PCI-E slot, then the BIOS instructs the CPU to reverse the order of PCI-E lanes electrically connected between the CPU and the second PCI-E slot.

In an embodiment of the invention, the BIOS control method for PCI-E lanes further includes: instructing the CPU to provide the PCI-E lanes whose number is 2N in reverse order to the second PCI-E slot via the BIOS if the first expansion card is not inserted in the first PCI-E slot.

In an embodiment of the invention, the BIOS control method for PCI-E lanes further includes: instructing the CPU to provide the PCI-E lanes whose number is a in the original order to the first PCI-E slot and provide the PCI-E lanes whose number is 2N−a in reverse order to the second PCI-E slot via the BIOS if the first expansion card is inserted in the first PCI-E slot, wherein 1<a<2N.

In an embodiment of the invention, the BIOS control method for PCI-E lanes further includes: instructing the CPU to provide the PCI-E lanes whose number is 2N in the original order to the first PCI-E slot via the BIOS if the first expansion card is inserted in the first PCI-E slot and the second expansion card is not inserted in the second PCI-E slot.

In an embodiment of the invention, 1st to a-th of processor pin sets of the CPU can be switchably electrically connected to 1st to a-th first PCI-E pin sets of the first PCI-E slot or (2N−a+1)th to 2N-th second PCI-E pin sets of the second PCI-E slot to form 1st to a-th of the PCI-E lanes, and (a+1)th to 2N-th processor pin sets of the CPU can be switchably electrically connected to (a+1)th to 2N-th first PCI-E pin sets of the first PCI-E slot or 1st to (2N−a)th second PCI-E pin sets of the second PCI-E slot to form (a+1)th to 2N-th of the PCI-E lanes, wherein 1<a<2N.

In an embodiment of the invention, a is N.

In an embodiment of the invention, the BIOS control method for PCI-E lanes further includes: forming 1st to a-th PCI-E lanes between 1st to a-th processor pin sets of the CPU and (2N−a+1)th to 2N-th of the second PCI-E pin sets of the second PCI-E slot and framing (a+1)th to 2N-th PCI-E lanes between (a+1)th to 2N-th processor pin sets of the CPU and 1st to (2N−a)th second PCI-E pin sets of the second PCI-E slot if the first expansion card is not inserted in the first PCI-E slot and the second expansion card is inserted in the second PCI-E slot.

In an embodiment of the invention, the BIOS control method for PCI-E lanes further includes: forming 1st to a-th PCI-E lanes between 1st to a-th processor pin sets of the CPU and 1st to a-th first PCI-E pin sets of the first PCI-E slot and forming (a+1)th to 2N-th PCI-E lanes between (a+1)th to 2N-th processor pin sets of the CPU and 1st to (2N−a)th second PCI-E pin sets of the second PCI-E slot if the first expansion card is inserted in the first PCI-E slot and the second expansion card is inserted in the second PCI-E slot.

In an embodiment of the invention, the BIOS control method for PCI-E lanes further includes: forming 1st to a-th PCI-E lanes between 1st to a-th processor pin sets of the CPU and 1st to a-th first PCI-E pin sets of the first PCI-E slot and forming (a+1)th to 2N-th PCI-E lanes between (a+1)th to 2N-th processor pin sets of the CPU and (a+1)th to 2N-th first PCI-E pin sets of the first PCI-E slot if the first expansion card is inserted in the first PCI-E slot and the second expansion card is not inserted in the second PCI-E slot.

In an embodiment of the invention, 2N is 16.

Based on the above, since the PCI-E lanes need to be assigned from the leftmost PCI-E pin set to the right in each PCI-E slot in order, but the numbering of the PCI-E lanes is not limited to increasing or decreasing, after the BIOS control method for PCI-E lanes of the invention detects that the second expansion card is inserted in the second PCI-E slot via the BIOS, the BIOS instructs the CPU to reverse the order of PCI-E lanes provided to the second PCI-E slot such that the 1st, 2nd, 3rd . . . second PCI-E pin sets of the second PCI-E slot are assigned to the 2N-th, (2N−1)th, (2N−2)th . . . PCI-E lanes of the CPU in order. If the first expansion card is not inserted in the first PCI-E slot, then all of the PCI-E lanes are assigned to the second PCI-E slot, such that the second PCI-E slot can receive the complete PCI-E signal. If the first expansion card is inserted in the first PCI-E slot, then a portion of the PCI-E lanes are assigned to the first PCI-E slot, and another portion of the PCI-E lanes are assigned to the second PCI-E slot, such that the dual expansion cards can still be operated together.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In general, when a user presses the power button to start a computer system, a BIOS 50 stored in flash ROM is electrically connected to a CPU 10 via a chipset, and prepares to perform initialization and checking operations on the hardware devices of the computer system. The BIOS 50 performs initialization operations on the CPU 10, the chipset, the memory, and peripheral devices, and confirms which peripheral devices are connected to the motherboard, and after ensuring that the hardware devices are operating normally upon completion of the booting process, the operating system is loaded into the memory to complete the booting process of the computer system.

For the stage in which the BIOS 50 confirms which peripheral devices are connected to the motherboard, since the average high-end motherboard is generally provided with two PCI-E slots (the first PCI-E slot 11 and the second PCI-E slot 12), the BIOS 50 detects which PCI-E slots that the PCI-E expansion cards are inserted in, and instructs the CPU 10 how to provide the PCI-E lanes to the first PCI-E slot 11 (generally the PCI-E slot adjacent to the CPU 10) and/or the second PCI-E slot 12 (generally the PCI-E slot farther from the CPU 10) according to the detection results.

In the BIOS 50 control method 100 for PCI-E lanes of the present embodiment, the BIOS 50 instructs the CPU 10 how to assign the PCI-E lanes to one or two PCI-E slots according to the detection results after the BIOS 50 confirms which PCI-E slots the PCI-E cards are inserted in. Even if the PCI-E expansion card is only inserted in the second PCI-E slot 12, the BIOS 50 control method 100 for PCI-E lanes of the present embodiment can assign all of the PCI-E lanes to the second PCI-E slot 12 such that the second PCI-E slot 12 can receive the complete PCI-E signal. Details are provided below.

It should be mentioned first that, a suitable motherboard module for the BIOS 50 control method 100 for PCI-E lanes of the present embodiment includes a CPU 10, a BIOS 50, a first PCI-E slot 11, and a second PCI-E slot 12 respectively electrically connected to the CPU 10, the first PCI-E slot 11 is a PCI-E slot adjacent to the CPU 10, and the second PCI-E slot 12 is a PCI-E slot away from the CPU 10.

Figure 1:
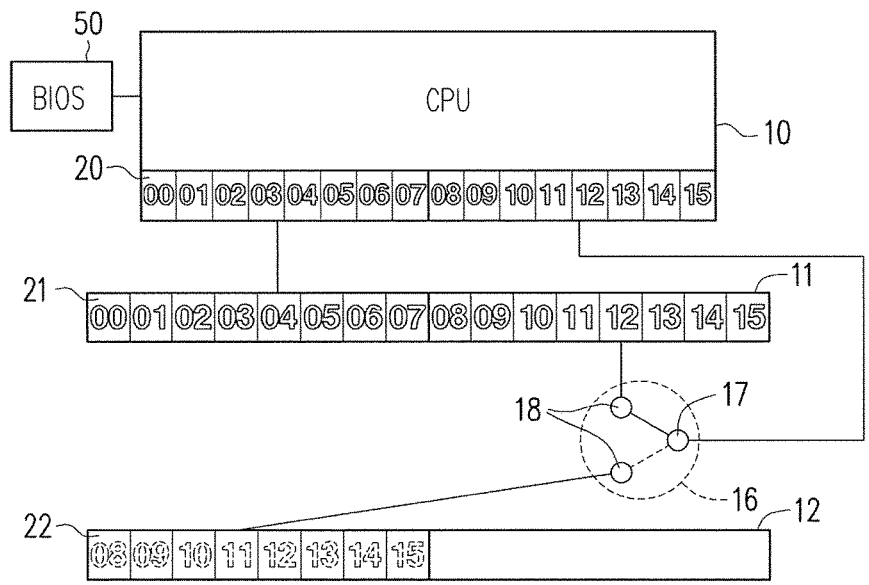
FIG. 1 and FIG. 2 are schematics of PCI-E lanes of a known CPU assigned in two PCI-E slots.
Figure 2:
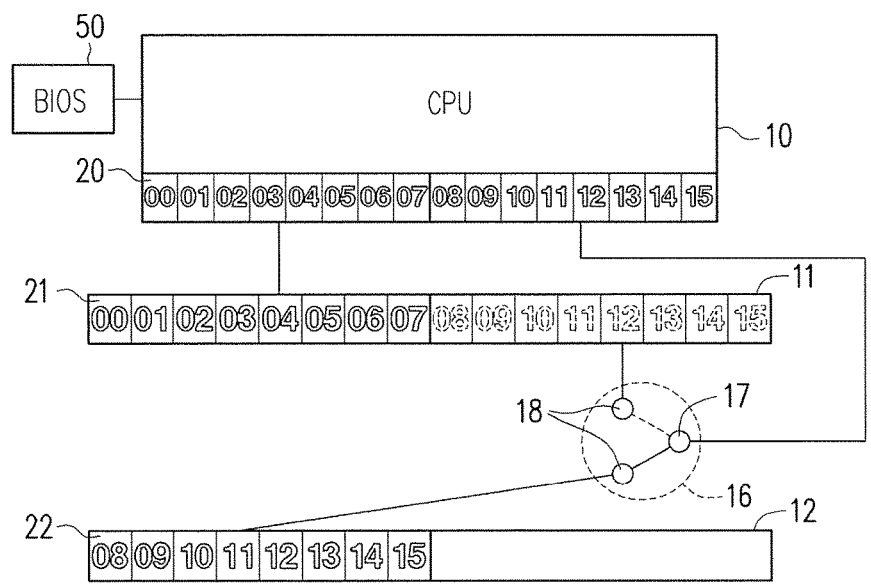
Figure 3:
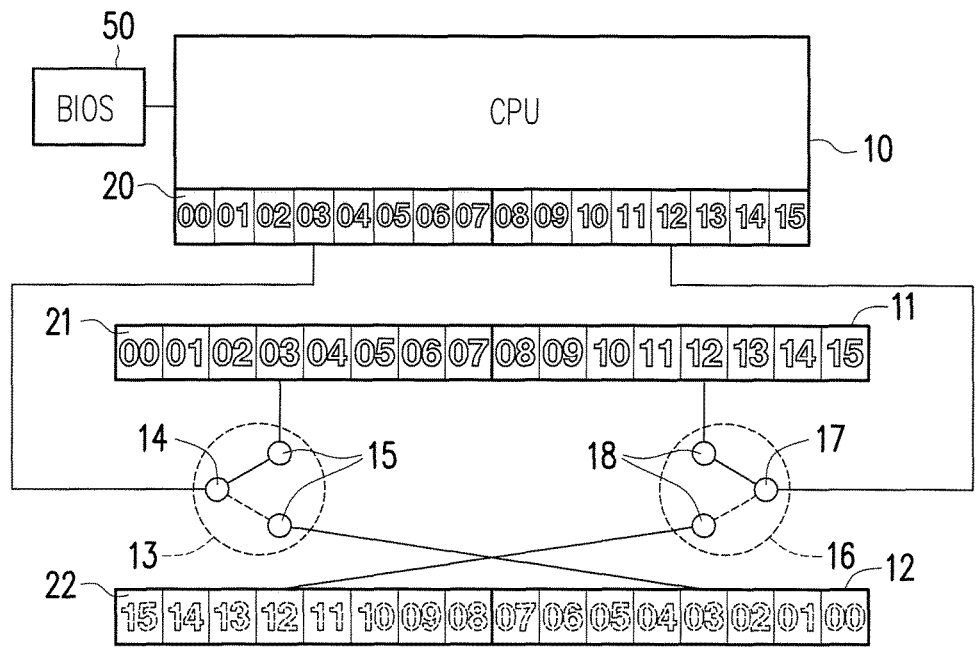
FIG. 3 to FIG. 5 are schematics of PCI-E lanes of a CPU assigned in two PCI-E slots according to an embodiment of the invention.
Figure 4:
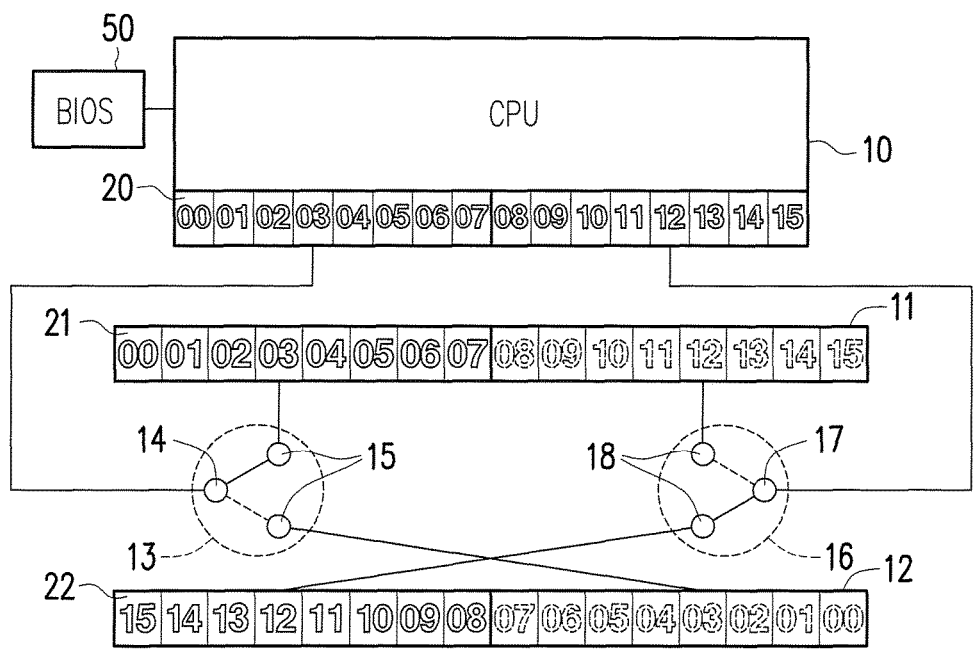
Figure 5:
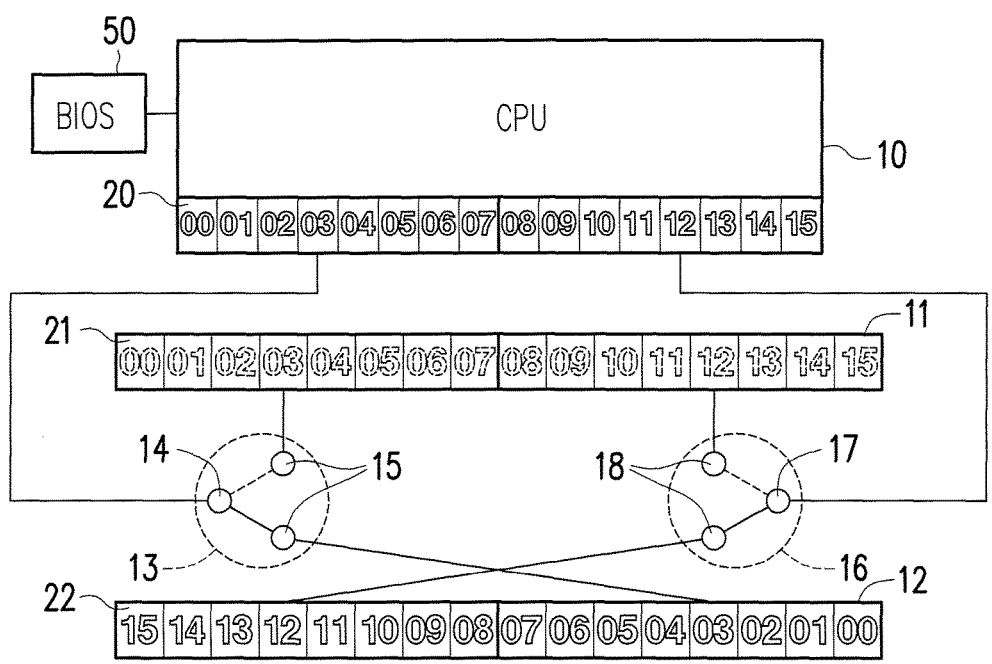

FIG. 3 to FIG. 5 are schematics of PCI-E lanes of the CPU 10 assigned in two PCI-E slots according to an embodiment of the invention. Referring first to FIG. 3 to FIG. 5, the CPU 10, the first PCI-E slot 11, and the second PCI-E slot 12 respectively support PCI-E lanes whose number is 2N, and the first PCI-E slot 11 and the second PCI-E slot 12 are respectively electrically connected to the CPU 10. In the present embodiment, 2N is 16 as an example, but the quantity of 2N can also be, for instance, 4, 8, or 32, and is not limited to 16.

In the embodiment, 1st to a-th processor pin sets 20 of the CPU 10 can be switchably electrically connected to 1st to a-th first PCI-E pin sets 21 of the first PCI-E slot 11 or (2N−a+1)th to 2N-th second PCI-E pin sets 22 of the second PCI-E slot 12 to form 1st to a-th PCI-E lanes, and (a+1)th to 2N-th processor pin sets 20 of the CPU 10 can be switchably electrically connected to (a+1)th to 2N-th first PCI-E pin sets 21 of the first PCI-E slot 11 or the 1st to (2N−a)th second PCI-E pin sets 22 of the second PCI-E slot 12 to form (a+1)th to 2N-th PCI-E lanes, wherein 1<a<2N. In the present embodiment, a is N as an example, but in other embodiments, a can also not be half of 2N, i.e., a is not N.

More specifically, in the present embodiment, the CPU 10, the first PCI-E slot 11, and the second PCI-E slot 12 respectively support 16 PCI-E lanes (i.e., x16 bandwidth). The 16 processor pin sets 20 of the CPU 10 correspond to the 16 PCI-E lanes, and the 16 PCI-E lanes are numbered 00 to 15 in order, wherein in the CPU 10, 1st to 8th processor pin sets 20 of FIG. 3 from the left correspond to the PCI-E lanes numbered 00 to 07, the 1st to 8th processor pin sets 20 are connected to a first input terminal 14 of a first switch 13, and a first input terminal 15 of a first switch 13 can be switchably electrically connected to 1st to 8th first PCI-E pin sets 21 of the first PCI-E slot 11 from the left or 9th to 16th second PCI-E pin sets 22 of the second PCI-E slot 12 from the left of FIG. 3 to form the 1st to a-th PCI-E lanes.

The 9th to 16th processor pin sets 20 of the CPU 10 correspond to the PCI-E lanes numbered 08 to 15, and are connected to a second input terminal 17 of a second switch 16. A second output terminal 18 of the second switch 16 can be switchably electrically connected to 9th to 16th first PCI-E pin sets 21 of the first PCI-E slot 11 or 1st to 8th second PCI-E pin sets 22 of the second PCI-E slot 12 to form (a+1)th to 2N-th PCI-E lanes. The first switch 13 and the second switch 16 can be physical switches, software programs, or any other forms of switching modes. If the first switch 13 and the second switch 16 are physical switches, then the first switch 13 and the second switch 16 can each further have a plurality of small switches (not shown) to switch a plurality of lanes. For instance, if one small switch can switch 2 lanes, then the first switch 13 and the second switch 16 can each have 4 small switches. Of course, the quantity of small switches of the first switch 13 and the second switch 16 is not limited thereto.

It should be mentioned that, the order of the PCI-E lanes of the first PCI-E slot 11 and the order of the PCI-E lanes of the second PCI-E slot 12 are reversed. The reason is that the assignment rule of the operable PCI-E lanes in each PCI-E slot is assigned from the leftmost PCI-E pin set to the rightward PCI-E pin sets in each PCI-E slot in order (left to right arrangement in the figure). In other words, as long as the leftmost PCI-E pin set and other numerically successive PCI-E pin sets in each PCI-E slot are assigned and the numbering of the assigned PCI-E lanes is consecutive, and the numbering order of the assigned PCI-E lanes is not limited to increasing or decreasing.

Therefore, to make all three modes in which the first expansion card is only inserted in the first PCI-E slot 11 (FIG. 3), the first expansion card and the second expansion card are inserted in both the first PCI-E slot 11 and the second PCI-E slot 12 (FIG. 4), and the second expansion card is only inserted in the second PCI-E slot 12 (FIG. 5) work and to allow the second PCI-E slot 12 to be assigned to the complete 16 PCI-E lanes when the second expansion card is only inserted in the second PCI-E slot 12, the BIOS 50 control method 100 for PCI-E lanes of the present embodiment assigns reversed numbering to the lanes of the second PCI-E slot 12 from left to right. Examples are provided below.

Figure 6:
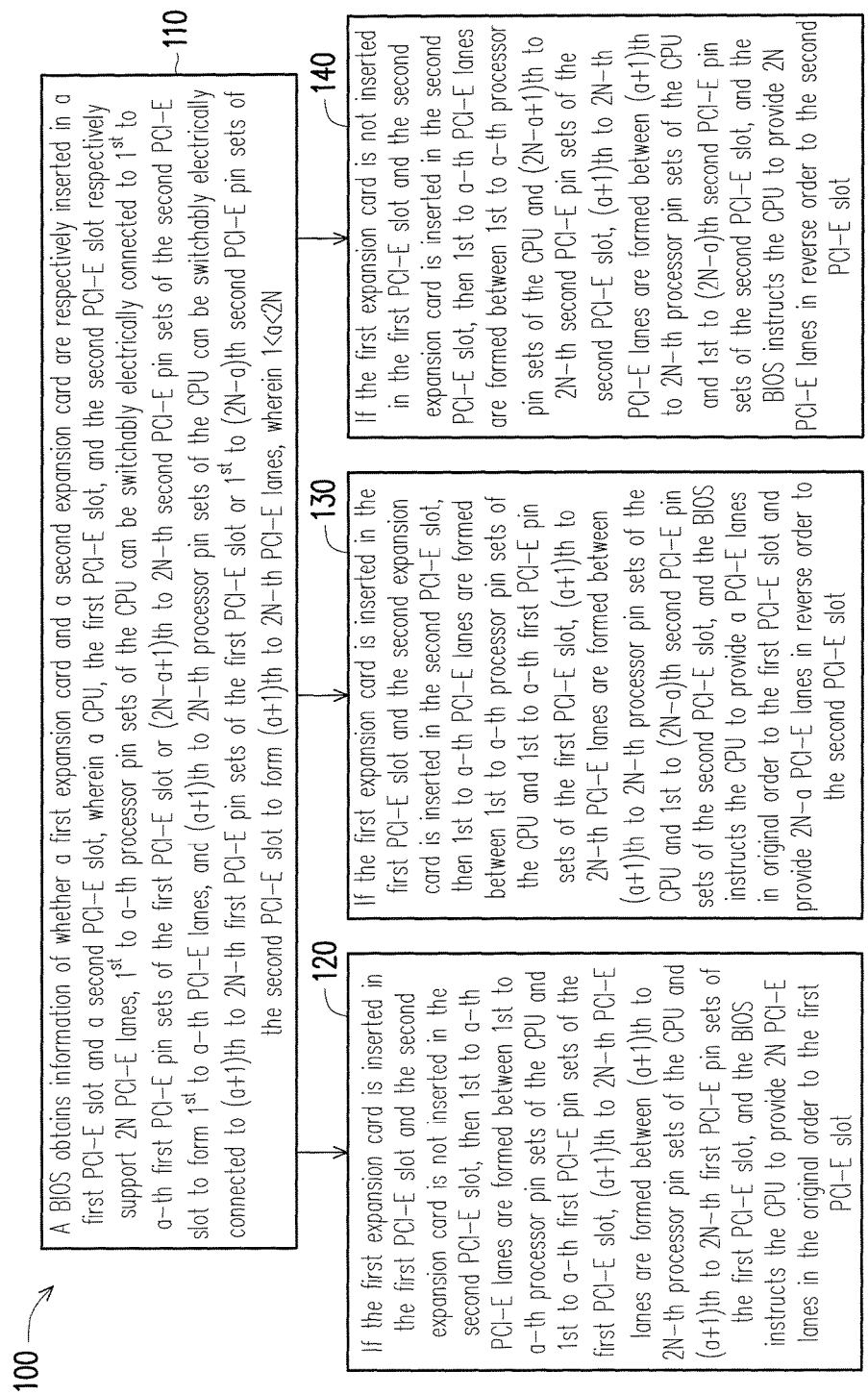
FIG. 6 is a schematic of a BIOS control method for PCI-E lanes according to an embodiment of the invention.

FIG. 6 is a schematic of a BIOS control method for PCI-E lanes according to an embodiment of the invention. Referring to all of FIG. 3 to FIG. 6, the BIOS 50 control method 100 for PCI-E lanes of the present embodiment includes the following steps.

First, as shown in step 110, the BIOS 50 obtains information of whether a first expansion card and a second expansion card are respectively inserted in the first PCI-E slot 11 and the second PCI-E slot 12.

In actuality, three conditions exist. First, the first expansion card is only inserted in the first PCI-E slot 11 (as shown in step 120 of FIG. 3 and FIG. 6). Second, the first expansion card and the second expansion card are inserted in both the first PCI-E slot 11 and the second PCI-E slot 12 (as shown in step 130 of FIG. 4 and FIG. 6). Third, the second expansion card is only inserted in the second PCI-E slot 12 (as shown in step 140 of FIG. 5 and FIG. 6).

Next, if the first expansion card is inserted in the first PCI-E slot 11 and the second expansion card is not inserted in the second PCI-E slot 12, i.e., the case of FIG. 3, then 1st to a-th PCI-E lanes are formed between 1st to a-th processor pin sets 20 of the CPU 10 and 1st to a-th first PCI-E pin sets 21 of the first PCI-E slot 11, (a+1)th to 2N-th PCI-E lanes are formed between (a+1)th to 2N-th processor pin sets 20 of the CPU 10 and (a+1)th to 2N-th first PCI-E pin sets 21 of the first PCI-E slot, and the BIOS 50 instructs the CPU 10 to provide PCI-E lanes whose number is 2N in the original order to the first PCI-E slot 11 (step 120). More specifically, if the first expansion card is only inserted in the first PCI-E slot 11, then the BIOS 50 instructs the CPU 10 to assign 16 PCI-E lanes to the first PCI-E slot 11 in the original order.

If the first expansion card is inserted in the first PCI-E slot 11 and the second expansion card is inserted in the second PCI-E slot 12, i.e., the case of FIG. 4, then 1st to a-th PCI-E lanes are formed between 1st to a-th processor pin sets 20 of the CPU 10 and 1st to a-th first PCI-E pin sets 21 of the first PCI-E slot 11, (a+1)th to 2N-th PCI-E lanes are formed between (a+1)th to 2N-th processor pin sets 20 of the CPU 10 and 1st to (2N−a)th second PCI-E pin sets 22 of the second PCI-E slot 12, and the BIOS 50 instructs the CPU 10 to provide the PCI-E lanes whose number is a in original order to the first PCI-E slot 11 and provide the PCI-E lanes whose number is 2N−a in reverse order to the second PCI-E slot 12 (step 130).

More specifically, the first expansion card and the second expansion card are inserted in both the first PCI-E slot 11 and the second PCI-E slot 12, the BIOS 50 instructs the CPU 10 to assign the 8 PCI-E lanes numbered 00 to 07 to the first eight first PCI-E pin sets 21 of the first PCI-E slot 11, and assign the 8 PCI-E lanes numbered 08 to 15 to the first eight second PCI-E pin sets 22 to the second PCI-E slot 12 in the reverse direction. The first PCI-E slot 11 and the second PCI-E slot 12 can operate as long as the consecutive 8 PCI-E lanes from the left are assigned to the consecutively-numbered PCI-E lanes, and the numbering can be decreasing or increasing. In the case of FIG. 4, the numbering of the first eight first PCI-E pin sets 21 of the first PCI-E slot 11 assigned to the PCI-E lanes in order is increasing (00 to 07), and the numbering of the first eight second PCI-E pin sets 22 of the second PCI-E slot 12 assigned to the PCI-E lanes in order is decreasing (15 to 08). In this case, the first PCI-E slot 11 and the second PCI-E slot 12 can be operated in the mode of x8, x8 bandwidth.

If the first expansion card is not inserted in the first PCI-E slot 11 and the second expansion card is inserted in the second PCI-E slot 12, i.e., the case of FIG. 5, then 1st to a-th PCI-E lanes are formed between 1st to a-th processor pin sets 20 of the CPU 10 and (2N−a+1)th to 2N-th second PCI-E pin sets 22 of the second PCI-E slot 12, (a+1)th to 2N-th PCI-E lanes are formed between (a+1)th to 2N-th processor pin sets 20 of the CPU 10 and 1st to (2N−a)th second PCI-E pin sets 22 of the second PCI-E slot 12, and the BIOS 50 instructs the CPU 10 to provide PCI-E lanes whose number is 2N in reverse order to the second PCI-E slot 12 (step 140).

More specifically, if the second expansion card is only inserted in the second PCI-E slot 12, then the BIOS 50 instructs the CPU 10 to assign 16 PCI-E lanes to the second PCI-E slot 12 all in reverse order, the 16 second PCI-E pin sets 22 of the second PCI-E slot 12 are assigned to the PCI-E lanes numbered in decreasing order (15 to 00) in order, and the second PCI-E slot 12 can receive the complete PCI-E signal.

Based on the above, since the PCI-E lanes need to be assigned from the leftmost PCI-E pin set to the right in each PCI-E slot in order, but the numbering of the PCI-E lanes is not limited to increasing or decreasing, after the BIOS control method for PCI-E lanes of the invention detects that the second expansion card is inserted in the second PCI-E slot via the BIOS, the BIOS instructs the CPU to reverse the order of PCI-E lanes provided to the second PCI-E slot such that 1st, 2nd, 3rd . . . second PCI-E pin sets of the second PCI-E slot are assigned to 2N-th, (2N−1)th, (2N−2)th . . . PCI-E lanes of the CPU in order. If the first expansion card is not inserted in the first PCI-E slot, then all of the PCI-E lanes are assigned to the second PCI-E slot, such that the second PCI-E slot can receive the complete PCI-E signal. If the first expansion card is inserted in the first PCI-E slot, then a portion of the PCI-E lanes are assigned to the first PCI-E slot, and another portion of the PCI-E lanes are assigned to the second PCI-E slot, such that the dual expansion cards can still be operated together.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A BIOS control method for PCI-E lanes suitable for applying to a motherboard module, wherein the motherboard module comprises a CPU, a BIOS, a first PCI-E slot, and a second PCI-E slot respectively electrically connected to the CPU, and the CPU, the first PCI-E slot, and the second PCI-E slot respectively support PCI-E lanes whose number is 2N, the BIOS control method for PCI-E lanes comprising:
   obtaining an information of whether a first expansion card and a second expansion card are respectively inserted in the first PCI-E slot and the second PCI-E slot via the BIOS; and
   instructing the CPU to control a switch circuit for assigning a reverse order of the PCI-E lanes electrically connected between the CPU and the second PCI-E slot via the BIOS if the second expansion card is inserted in the second PCI-E slot, where the reverse order is reversed to an order of the PCI-E lanes electrically connected between the CPU and the first PCI-E slot.

2. The BIOS control method for the PCI-E lanes of claim 1, further comprising:
   instructing the CPU to provide the PCI-E lanes whose number is 2N in the reverse order to the second PCI-E slot via the BIOS if the first expansion card is not inserted in the first PCI-E slot.

3. The BIOS control method for PCI-E lanes of claim 2, wherein 1st to a-th processor pin sets of the CPU can be switchably electrically connected to 1st to a-th first PCI-E pin sets of the first PCI-E slot or (2N−a+1)th to 2N-th of the second PCI-E pin sets of the second PCI-E slot to form 1st to a-th of the PCI-E lanes, and (a+1)th to 2N-th processor pin sets of the CPU can be switchably electrically connected to (a+1)th to 2N-th of the first PCI-E pin sets of the first PCI-E slot or 1st to (2N−a)th of the second PCI-E pin sets of the second PCI-E slot to form (a+1)th to 2N-th of the PCI-E lanes, wherein 1<a<2N.

4. The BIOS control method for the PCI-E lanes of claim 3, further comprising:
   forming the 1st to a-th of the PCI-E lanes between the 1st to a-th of the processor pin sets of the CPU and the (2N−a+1)th to 2N-th of the second PCI-E pin sets of the second PCI-E slot and forming the (a+1)th to 2N-th of the PCI-E lanes between the (a+1)th to 2N-th of the processor pin sets of the CPU and the 1st to (2N−a)th of the second PCI-E pin sets of the second PCI-E slot if the first expansion card is not inserted in the first PCI-E slot and the second expansion card is inserted in the second PCI-E slot.

5. The BIOS control method for the PCI-E lanes of claim 3, further comprising:
   forming the 1st to a-th of the PCI-E lanes between the 1st to a-th of the processor pin sets of the CPU and the 1st to a-th of the first PCI-E pin sets of the first PCI-E slot and forming the (a+1)th to 2N-th of the PCI-E lanes between the (a+1)th to 2N-th of the processor pin sets of the CPU and the 1st to (2N−a)th of the second PCI-E pin sets of the second PCI-E slot if the first expansion card is inserted in the first PCI-E slot and the second expansion card is inserted in the second PCI-E slot.

6. The BIOS control method for the PCI-E lanes of claim 3, further comprising:
   forming the 1st to a-th of the PCI-E lanes between the 1st to a-th of the processor pin sets of the CPU and the 1st to a-th of the first PCI-E pin sets of the first PCI-E slot and forming the (a+1)th to 2N-th of the PCI-E lanes between the (a+1)th to 2N-th of the processor pin sets of the CPU and the (a+1)th to 2N-th of the first PCI-E pin sets of the first PCI-E slot if the first expansion card is inserted in the first PCI-E slot and the second expansion card is not inserted in the second PCI-E slot.

7. The BIOS control method for PCI-E lanes of claim 3, wherein a is N.

8. The BIOS control method for the PCI-E lanes of claim 1, further comprising:
   instructing the CPU to provide the PCI-E lanes whose number is in an original order to the first PCI-E slot and provide the PCI-E lanes whose number is 2N-a in the reverse order to the second PCI-E slot via the BIOS if the first expansion card is inserted in the first PCI-E slot, wherein 1<a<2N.

9. The BIOS control method for PCI-E lanes of claim 1, further comprising:
   instructing the CPU to provide the PCI-E lanes whose number is 2N in an original order to the first PCI-E slot via the BIOS if the first expansion card is inserted in the first PCI-E slot and the second expansion card is not inserted in the second PCI-E slot.

10. The BIOS control method for PCI-E lanes of claim 1, wherein 1st to a-th processor pin sets of the CPU can be switchably electrically connected to 1st to a-th first PCI-E pin sets of the first PCI-E slot or (2N−a+1)th to 2N-th of the second PCI-E pin sets of the second PCI-E slot to form 1st to a-th of the PCI-E lanes, and (a+1)th to 2N-th processor pin sets of the CPU can be switchably electrically connected to (a+1)th to 2N-th of the first PCI-E pin sets of the first PCI-E slot or 1st to (2N−a)th of the second PCI-E pin sets of the second PCI-E slot to form (a+1)th to 2N-th of the PCI-E lanes, wherein 1<a<2N.

11. The BIOS control method for PCI-E lanes of claim 10, wherein a is N.

12. The BIOS control method for the PCI-E lanes of claim 10, further comprising:
   forming the 1st to a-th of the PCI-E lanes between the 1st to a-th of the processor pin sets of the CPU and the (2N−a+1)th to 2N-th of the second PCI-E pin sets of the second PCI-E slot and forming the (a+1)th to 2N-th of the PCI-E lanes between the (a+1)th to 2N-th of the processor pin sets of the CPU and the 1st to (2N−a)th of the second PCI-E pin sets of the second PCI-E slot if the first expansion card is not inserted in the first PCI-E slot and the second expansion card is inserted in the second PCI-E slot.

13. The BIOS control method for the PCI-E lanes of claim 10, further comprising:
forming the 1st to a-th of the PCI-E lanes between the 1st to a-th of the processor pin sets of the CPU and the 1st to a-th of the first PCI-E pin sets of the first PCI-E slot and forming the (a+1)th to 2N-th of the PCI-E lanes between the (a+1)th to 2N-th of the processor pin sets of the CPU and the 1st to (2N−a)th of the second PCI-E pin sets of the second PCI-E slot if the first expansion card is inserted in the first PCI-E slot and the second expansion card is inserted in the second PCI-E slot.

14. The BIOS control method for the PCI-E lanes of claim 10, further comprising:
forming the 1st to a-th of the PCI-E lanes between the 1st to a-th of the processor pin sets of the CPU and the 1st to a-th of the first PCI-E pin sets of the first PCI-E slot and forming the (a+1)th to 2N-th of the PCI-E lanes between the (a+1)th to 2N-th of the processor pin sets of the CPU and the (a+1)th to 2N-th of the first PCI-E pin sets of the first PCI-E slot if the first expansion card is inserted in the first PCI-E slot and the second expansion card is not inserted in the second PCI-E slot.

15. The BIOS control method for the PCI-E lanes of claim 1, wherein 2N is 16.

* * * * *